(12) United States Patent
Uchiyama et al.

(10) Patent No.: US 11,946,495 B2
(45) Date of Patent: Apr. 2, 2024

(54) HYDRAULIC CYLINDER

(71) Applicant: SMC CORPORATION, Chiyoda-ku (JP)

(72) Inventors: Hideki Uchiyama, Katsushika-ku (JP); Kenji Suda, Tsukuba (JP); Makoto Saito, Soka (JP)

(73) Assignee: SMC CORPORATION, Chiyoda-ku (JP)

( * ) Notice: Subject to any disclaimer, the term of this patent is extended or adjusted under 35 U.S.C. 154(b) by 102 days.

(21) Appl. No.: 17/771,560

(22) PCT Filed: Jul. 20, 2020

(86) PCT No.: PCT/JP2020/027998
§ 371 (c)(1),
(2) Date: Apr. 25, 2022

(87) PCT Pub. No.: WO2021/084815
PCT Pub. Date: May 6, 2021

(65) Prior Publication Data
US 2022/0373001 A1    Nov. 24, 2022

(30) Foreign Application Priority Data
Oct. 29, 2019    (JP) ................................. 2019-195765

(51) Int. Cl.
*F15B 15/28*    (2006.01)
*F15B 19/00*    (2006.01)

(52) U.S. Cl.
CPC ........ *F15B 15/2861* (2013.01); *F15B 19/005* (2013.01)

(58) Field of Classification Search
CPC ... G01D 5/145; F15B 19/005; F15B 15/2861; H02K 41/031
See application file for complete search history.

(56) References Cited

U.S. PATENT DOCUMENTS

| | | | |
|---|---|---|---|
| 11,225,984 B2 * | 1/2022 | Noda | .................... F15B 15/14 |
| 2007/0216401 A1 * | 9/2007 | Baak | ................ F15B 15/2861 |
| | | | 324/207.2 |

(Continued)

FOREIGN PATENT DOCUMENTS

| | | |
|---|---|---|
| EP | 3 428 582 A1 | 1/2019 |
| JP | 4-5904 U | 5/1992 |

(Continued)

OTHER PUBLICATIONS

International Search Report dated Sep. 24, 2020 in PCT/JP2020/027998 filed on Jul. 20, 2020. (2 pages).

(Continued)

*Primary Examiner* — Abiy Teka
(74) *Attorney, Agent, or Firm* — Oblon, McClelland, Maier & Neustadt, L.L.P.

(57) ABSTRACT

A first MR sensor and a second MR sensor are a combination of a first magnetic resistance effect element pattern and a second magnetic resistance effect element pattern. The first MR sensor and the second MR sensor are disposed a prescribed distance apart such that, when the first MR sensor receives the greatest quantity of the magnetic field component of a magnet oriented parallel to the axial direction of a piston, the second MR sensor receives the greatest quantity of the magnetic field component of a magnet oriented parallel to the radial direction of the piston.

10 Claims, 20 Drawing Sheets

(56) References Cited

U.S. PATENT DOCUMENTS

2016/0377452 A1* 12/2016 Heineck .................. G01D 5/12
                                                          324/207.11
2021/0101435 A1*  4/2021 Yamazaki ............... F16F 15/03

FOREIGN PATENT DOCUMENTS

| JP | 8-75403 A | 3/1996 |
| JP | 11-311214 A | 11/1999 |
| JP | 2009-128301 A | 6/2009 |

OTHER PUBLICATIONS

Indian Office Action dated Sep. 14, 2022 in Indian Patent Application No. 202247029741, 5 pages.
Extended European Search Report dated Nov. 7, 2023, in European Patent Application No. 20882532.3.

* cited by examiner

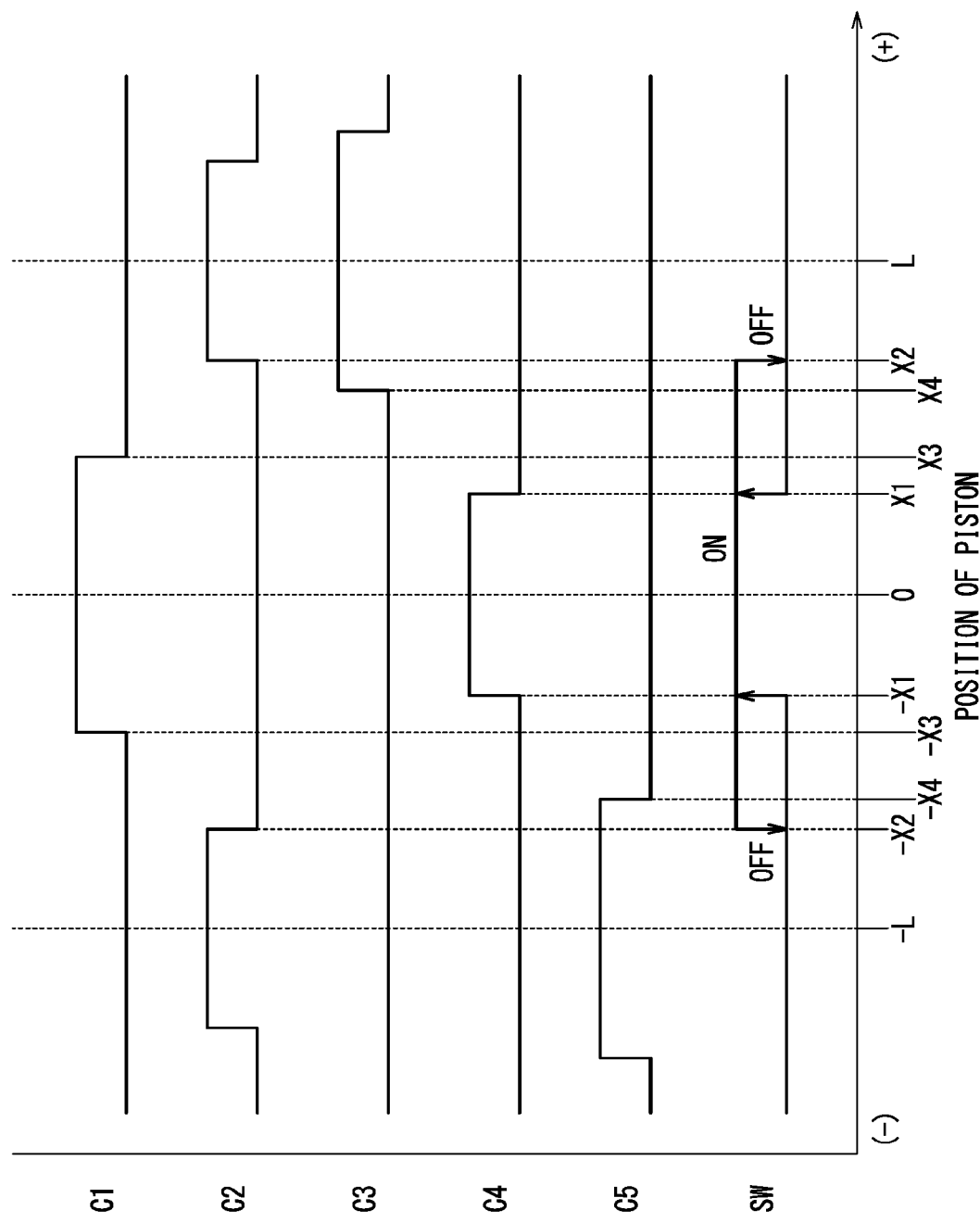

HYDRAULIC CYLINDER

TECHNICAL FIELD

The present invention relates to a fluid pressure cylinder (hydraulic cylinder), and in particular, a fluid pressure cylinder (hydraulic cylinder) provided with a position detecting mechanism.

BACKGROUND ART

Conventionally, a fluid pressure cylinder is known which detects a position of a piston by mounting a magnet (permanent magnet) on the piston, and providing a magnetic sensor on a cylinder tube that detects a magnetic field of the magnet.

In the case that such a fluid pressure cylinder is used in an environment in which an external magnetic field is present, the position of the piston may be erroneously detected due to an influence of the external magnetic field.

In JP H04-059404 U, a position detection device for a fluid pressure actuator is disclosed in which the occurrence of a malfunction due to an external magnetic field is suppressed. Such a position detection device is a device in which a first detection sensor and a second detection sensor are installed in a displacement direction of a piston in which a permanent magnet is incorporated, and wherein by subjecting an output of the first detection sensor and an output of the second detection sensor to a subtraction process, an influence of the external magnetic field is canceled out.

SUMMARY OF THE INVENTION

However, in JP H04-059404 U, only an external magnetic field is considered, such as an external magnetic field in a welding line, in which the magnetic field acting on the first detection sensor and the magnetic field acting on the second detection sensor are identical to each other. Therefore, a fluid pressure cylinder is desired in which, by means of a simple magnetic sensor configuration or the like, it is possible to prevent the position of the piston from being erroneously detected when various external magnetic fields act thereon.

The present invention has been devised taking into consideration such circumstances, and has the object of providing a fluid pressure cylinder in which magnetoresistive effect elements are effectively utilized, in a manner so that erroneous detection of the position of the piston does not occur, even if various external magnetic fields act thereon.

A fluid pressure cylinder according to the present invention is configured to detect that a piston is in a predetermined position, by detecting a magnetic field of a magnet mounted on the piston, using a first MR sensor and a second MR sensor mounted on a cylinder tube, wherein the first MR sensor and the second MR sensor are each a combination of a first magnetoresistive effect element pattern in which a resistance value thereof decreases according to an intensity of the magnetic field oriented in a direction parallel to an axial direction of the piston, and a second magnetoresistive effect element pattern in which a resistance value thereof decreases according to an intensity of the magnetic field oriented in a direction parallel to a radial direction of the piston. In addition, the first MR sensor and the second MR sensor are arranged at a predetermined interval in a manner so that, when the first MR sensor mainly receives a magnetic field component of the magnet oriented in the direction parallel to the axial direction of the piston, the second MR sensor mainly receives a magnetic field component of the magnet oriented in the direction parallel to the radial direction of the piston.

Further, the fluid pressure cylinder according to the present invention may be configured to detect that a piston is in a predetermined position, by detecting a magnetic field of a magnet mounted on the piston, using a first MR sensor, a second MR sensor, and a third MR sensor mounted on a cylinder tube. The first MR sensor, the second MR sensor, and the third MR sensor are each a combination of a first magnetoresistive effect element pattern in which a resistance value thereof decreases according to an intensity of the magnetic field oriented in a direction parallel to an axial direction of the piston, and a second magnetoresistive effect element pattern in which a resistance value thereof decreases according to an intensity of the magnetic field oriented in a direction parallel to a radial direction of the piston. In addition, the second MR sensor and the third MR sensor are arranged alongside one another at a predetermined interval in the direction parallel to the axial direction of the piston in a manner so that, when the first MR sensor mainly receives a magnetic field component of the magnet oriented in the direction parallel to the axial direction of the piston, the second MR sensor and the third MR sensor mainly receive a magnetic field component of the magnet oriented in the direction parallel to the radial direction of the piston.

In accordance with the above-described fluid pressure cylinder, by effectively utilizing the function of the MR sensors, the position of the piston can be detected accurately, and the position of the piston can be prevented from being erroneously detected when various external magnetic fields act thereon.

In the fluid pressure cylinder according to the present invention, the plurality of MR sensors, each of which is equipped with a pair of magnetoresistive effect element patterns that react respectively in two directions perpendicular to each other, are arranged at a predetermined interval, whereby the position of the piston can be detected with high accuracy, and there is no concern over the position of the piston being erroneously detected even if various external magnetic fields act thereon.

BRIEF DESCRIPTION OF DRAWINGS

FIG. 20 is a diagram showing outputs or the like of comparison units corresponding to the position of the piston in the fluid pressure cylinder shown in FIG. 17.

DESCRIPTION OF THE INVENTION

Hereinafter, a description of a plurality of preferred embodiments concerning a fluid pressure cylinder according to the present invention will be described with reference to the accompanying drawings.

First Embodiment

Figure 1:
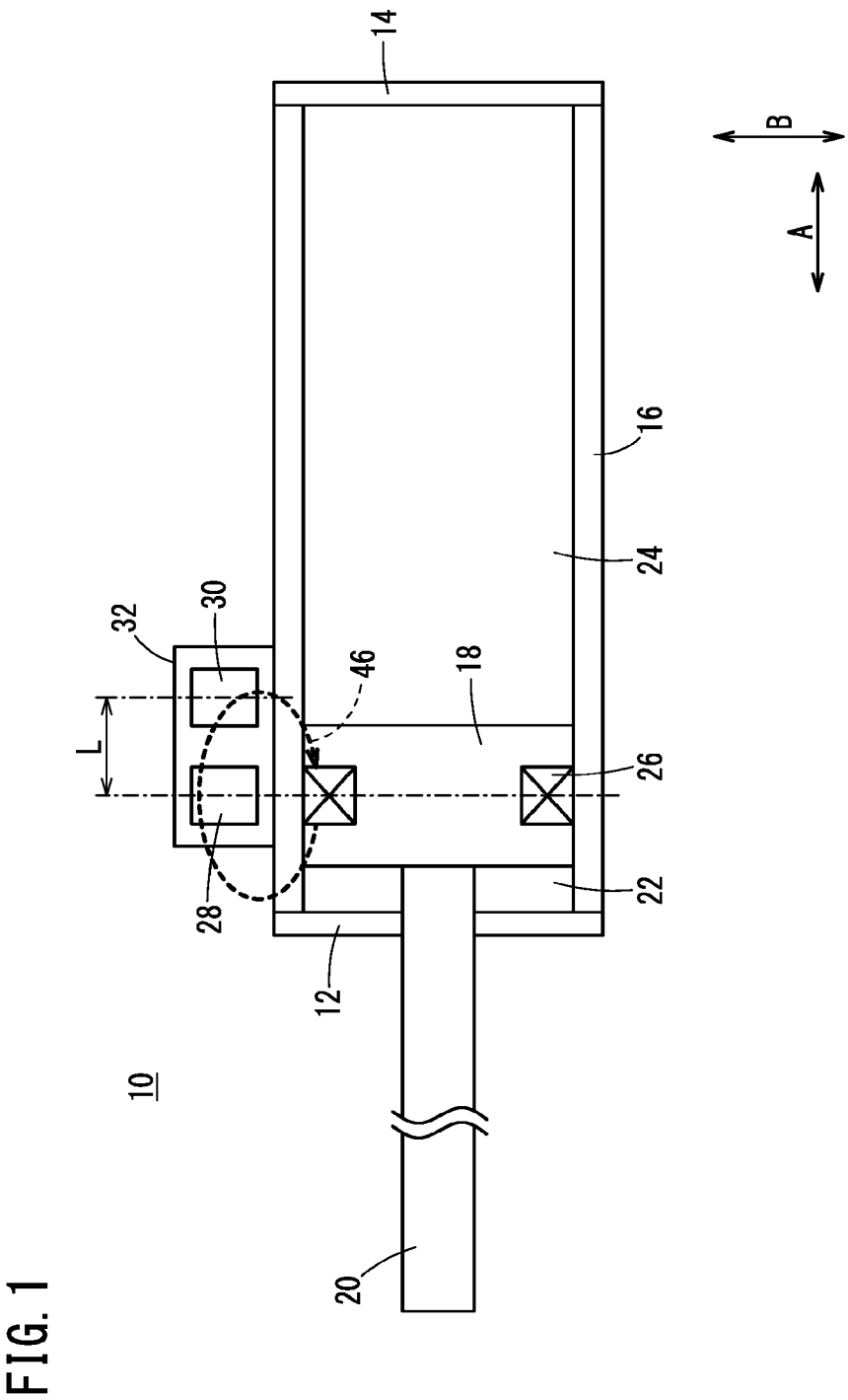
FIG. 1 is a schematic diagram at a time when a fluid pressure cylinder according to a first embodiment of the present invention is in a predetermined operating position.

A description will be given with reference to FIGS. 1 to 16 concerning a fluid pressure cylinder 10 according to a first embodiment of the present invention. As shown in FIG. 1, the fluid pressure cylinder 10 includes a cylinder tube 16, one end of which is sealed by a rod cover 12 and another end of which is sealed with a head cover 14, a piston 18 slidably arranged inside the cylinder tube 16, and a piston rod 20 connected to the piston 18. The cylinder tube 16, the rod cover 12, the head cover 14, the piston 18, and the piston rod 20 are all made of a non-magnetic material such as an aluminum alloy or the like.

In the following description, when terms relating to up, down, left, and right directions are used, for the sake of convenience, such terms refer to the directions shown in the drawings, however, the actual arrangement of the constituent members and the like are not limited thereby. Further, the direction parallel to the axial direction of the piston 18, which is the direction in which the piston 18 slides, i.e., the left-right direction in the drawing, is sometimes referred to as an A direction, and the direction parallel to the radial direction of the piston 18, i.e., the vertical direction in the drawing, is sometimes referred to as a B direction.

An internal space of the cylinder tube 16 is partitioned by the piston 18 into a first pressure chamber 22 on the side of the rod cover 12, and a second pressure chamber 24 on the side of the head cover 14. A pressure fluid is supplied to and discharged from the first pressure chamber 22 and the second pressure chamber 24, respectively, via non-illustrated ports. One end of the piston rod 20 is connected to the piston 18, and another end of the piston rod 20 extends to the exterior through the rod cover 12.

When the pressure fluid is supplied to the first pressure chamber 22 and the pressure fluid in the second pressure chamber 24 is discharged, the piston 18 moves rightward and the piston rod 20 is pulled inward. When the pressure fluid is supplied to the second pressure chamber 24 and the pressure fluid in the first pressure chamber 22 is discharged, the piston 18 moves leftward and the piston rod 20 is pushed outward.

In the present embodiment, required work is performed in an outward pushing process of the piston rod 20. For example, in a welding line, a workpiece, which is a plate material to be welded, is positioned and held by the other end of the piston rod 20. Moreover, a step in which the piston 18 moves in the direction to push out the piston rod 20 is referred to as a "drive step," and a step in which the piston 18 moves in a direction to pull the piston rod 20 inward is referred to as a "return step".

An annular magnet (permanent magnet) 26 is mounted on an outer circumferential portion of the piston 18. The magnet 26 is magnetized in the A direction, a left end surface of the magnet 26 is an N-pole, and a right end surface thereof is an S-pole. A magnetic field (magnetic flux) 46, which emerges from the left end surface of the magnet 26, passes through an outer side in the radial direction of the magnet 26, and returns to the right end surface of the magnet 26, is formed around the magnet 26. The magnetic field 46 extends to a predetermined region beyond the cylinder tube 16. According to the present embodiment, the shape of the magnet 26 is an annular shape that encircles the piston 18 by 360 degrees; however, in the case in which a structure that regulates the rotation of the piston 18 is provided, the shape of the magnet 26 need not necessarily be an annular shape.

A first MR sensor 28 and a second MR sensor 30, which serve as magnetic sensors using magnetoresistive effect elements, are mounted with a predetermined distance L therebetween in the A direction, on an outer side of the cylinder tube 16 in close proximity to the rod cover 12. Further, a sensor module 32, which is connected to the first MR sensor 28 and the second MR sensor 30 and which processes the outputs of these sensors, is provided on the outer side of the cylinder tube 16. According to the present embodiment, although the first MR sensor 28 and the second MR sensor 30 are provided separately from the sensor module 32, the sensors may be incorporated in the sensor module 32.

Figure 2:
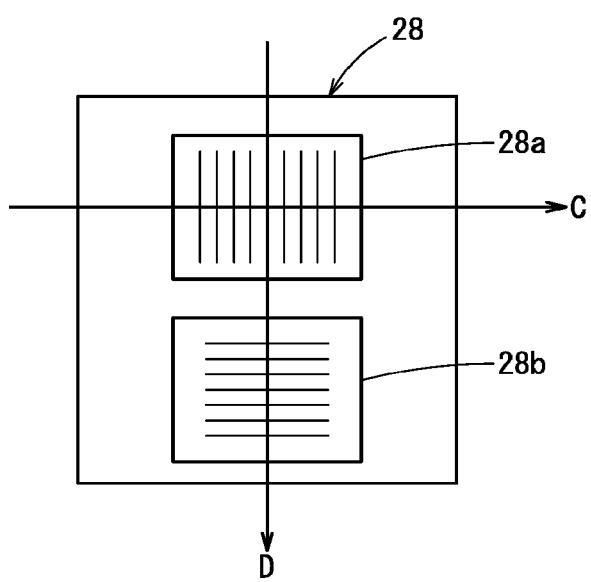
FIG. 2 is a schematic diagram showing a configuration of MR sensors that are provided in the fluid pressure cylinder shown in FIG. 1.

Since the first MR sensor 28 and the second MR sensor 30 have the same configuration, a representative description will be given with reference to FIGS. 2 and 3 concerning the configuration of the first MR sensor 28. As shown in FIG. 2, the first MR sensor 28 is a combination of a first magnetoresistive effect element pattern 28a which reacts to a magnetic field in a C direction, and the resistance value of which decreases according to the intensity of the magnetic field, and a second magnetoresistive effect element pattern 28b which reacts to a magnetic field in a D direction perpendicular to the C direction, and the resistance value of which decreases according to the intensity of the magnetic field.

Figure 3:
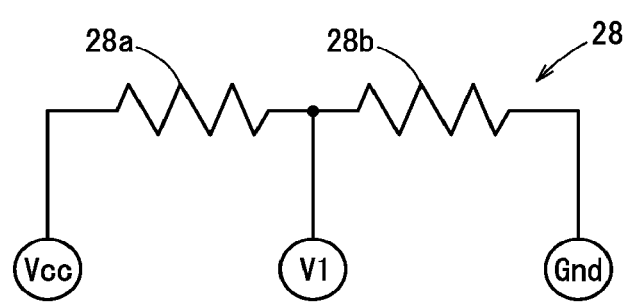
FIG. 3 is a circuit diagram showing a configuration of the MR sensors that are provided in the fluid pressure cylinder shown in FIG. 1.

As shown in FIG. 3, one end of the first magnetoresistive effect element pattern 28a is connected to a positive power supply voltage (Vcc), and one end of the second magnetoresistive effect element pattern 28b is connected to a reference voltage (Gnd). A potential at a connection point between the first magnetoresistive effect element pattern 28a and the second magnetoresistive effect element pattern 28b becomes an output (V1) of the first MR sensor 28. When the resistance value of the first magnetoresistive effect element pattern 28a decreases, the potential at the connection point increases, and when the resistance value of the second magnetoresistive effect element pattern 28b decreases, the potential at the connection point decreases.

Next, a description will be given concerning a mounted posture and a mounted position of the first MR sensor 28 and the second MR sensor 30 with respect to the cylinder tube 16.

Mounted Posture of the Sensors

The first MR sensor 28 is mounted on the outer side of the cylinder tube 16, at a posture so that the C direction in which the first magnetoresistive effect element pattern 28a reacts becomes the A direction, and the D direction in which the second magnetoresistive effect element pattern 28b reacts becomes the B direction. Similarly, the second MR sensor 30 is also mounted on the outer side of the cylinder tube 16, at a posture so that the direction in which the first magnetoresistive effect element pattern reacts becomes the A direction, and the direction in which the second magnetoresistive effect element pattern reacts becomes the B direction.

Mounted Positions of the Sensors

The first MR sensor 28 is mounted at a position to receive mainly a component in the A direction of the magnetic field 46 of the magnet 26 mounted on the piston 18 when the piston 18 is in the reference position shown in FIG. 1. On the other hand, the second MR sensor 30 is mounted on the right side of the first MR sensor 28, and at a position to receive mainly a component in the B direction of the magnetic field 46 of the magnet 26 when the piston 18 is in the reference position. In other words, the first MR sensor 28 and the second MR sensor 30 are arranged with the predetermined distance L therebetween in the A direction, in a manner so that, when the first MR sensor 28 receives mainly the component in the A direction of the magnetic field 46 of the magnet 26, the second MR sensor 30 receives mainly the component in the B direction of the magnetic field 46 of the magnet 26.

According to the present invention, the reference position of the piston 18 is defined as a position at a time when a non-illustrated workpiece is positioned and held slightly prior to the piston 18 reaching the stroke end in the drive step.

Figure 4:
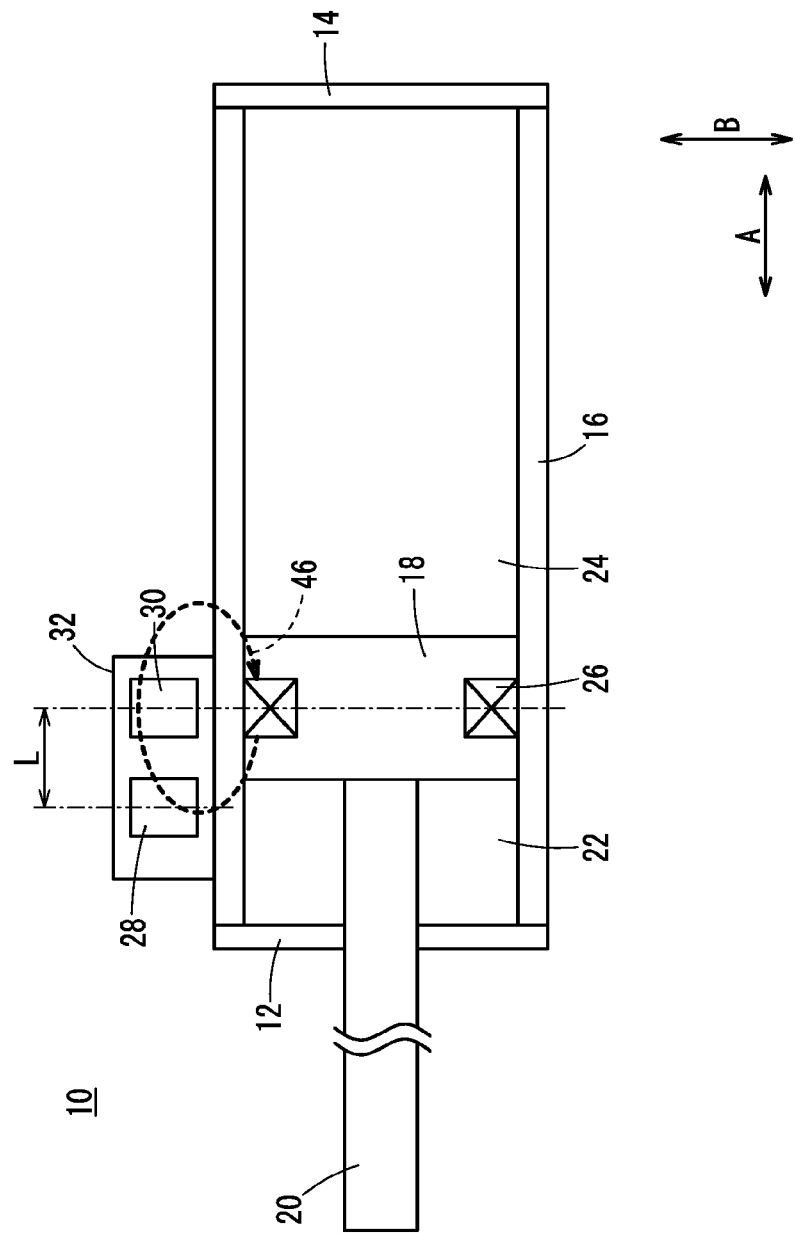
FIG. 4 is a schematic diagram at a time when the fluid pressure cylinder shown in FIG. 1 is in a different operating position.
Figure 5:
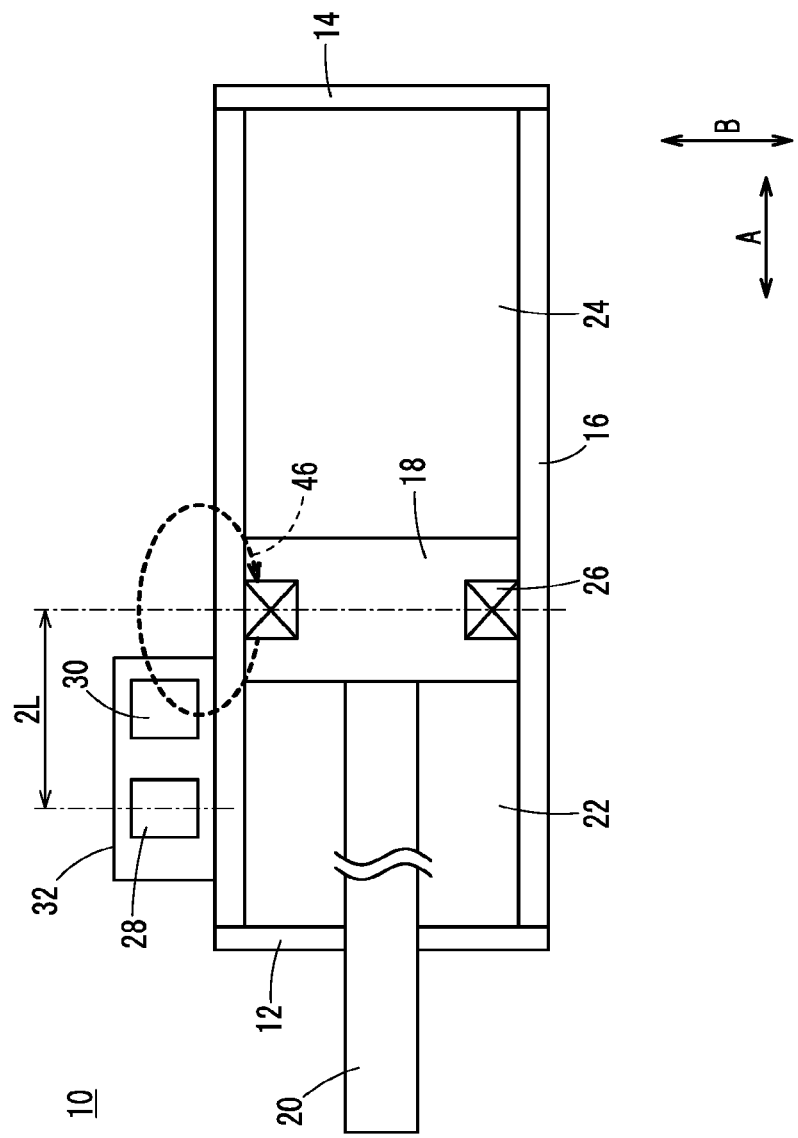
FIG. 5 is a schematic diagram at a time when the fluid pressure cylinder shown in FIG. 1 is in another different operating position.

As shown in FIG. 4, when the piston 18 is at a position separated by a distance L to the right from the reference position, the first MR sensor 28 receives largely the component in the B direction of the magnetic field 46 of the magnet 26, and the second MR sensor 30 receives largely the component in the A direction of the magnetic field 46 of the magnet 26. Further, as shown in FIG. 5, when the piston 18 is at a position separated by a distance 2L to the right from the reference position, the first MR sensor 28 receives almost no influence of the magnetic field 46 of the magnet 26, and the second MR sensor 30 receives largely the component in the B direction of the magnetic field 46 of the magnet 26.

Figure 6:
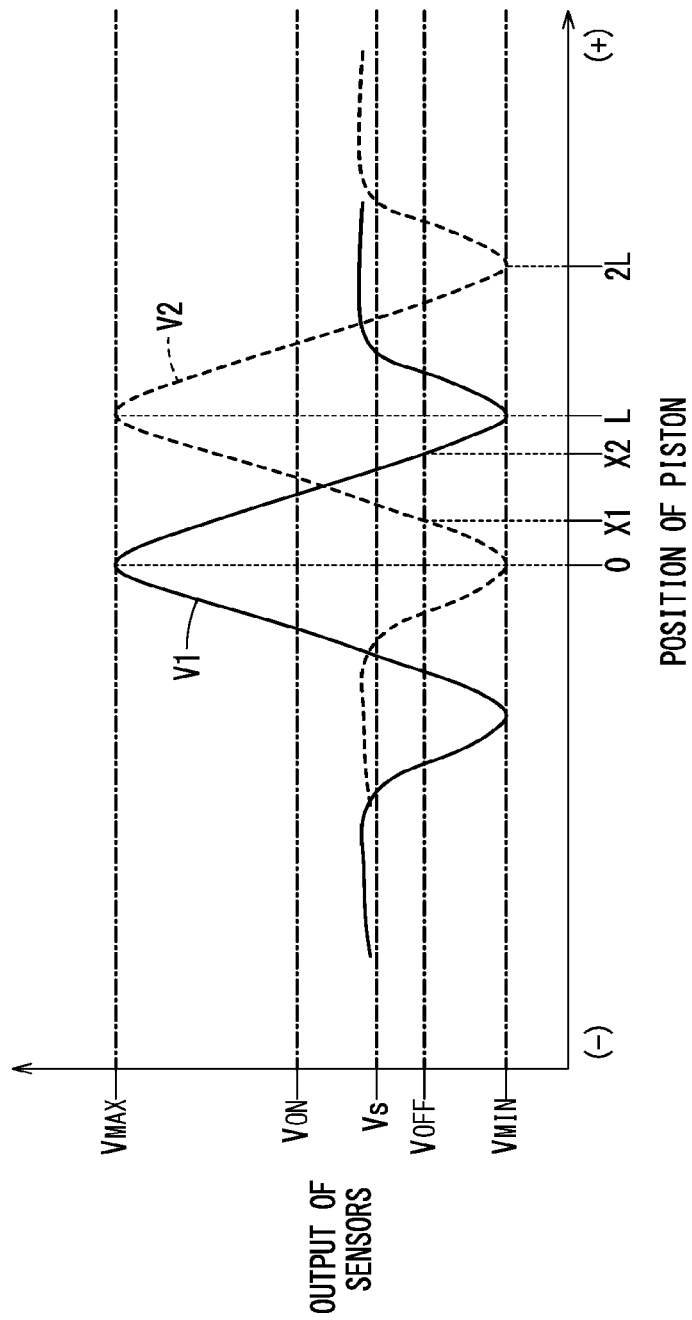
FIG. 6 is a diagram showing an output of the MR sensors corresponding to a position of a piston in the fluid pressure cylinder shown in FIG. 1.

FIG. 6 is a diagram showing an output V1 of the first MR sensor 28 and an output V2 of the second MR sensor 30 corresponding to a position X of the piston 18. The horizontal axis indicates the position X of the piston 18, and the vertical axis indicates the output of the sensors. The output V1 of the first MR sensor 28 is shown by a solid line, and the output V2 of the second MR sensor 30 is shown by a dashed line. The position X of the piston 18 is set to an origin point when the piston 18 is at the reference position, and assumes a positive value when the piston 18 is on the right side of the origin point. Moreover, for the sake of convenience, the output V1 of the first MR sensor 28 and the output V2 of the second MR sensor 30 are shown, including a case in which the piston 18 is located leftward beyond the stroke end.

The output V1 of the first MR sensor 28 becomes a maximum value $V_{MAX}$ when the piston 18 is at the origin point (when X=0), and becomes a minimum value $V_{MIN}$ when X=L. The output V2 of the second MR sensor 30 becomes a maximum value $V_{MAX}$ when X=L, and becomes a minimum value $V_{MIN}$ when X=0 and X=2L. Since the second MR sensor 30 is arranged to the right by the predetermined distance L from the first MR sensor 28, the waveform of the output V2 of the second MR sensor 30 is the same as the waveform of the output V1 of the first MR sensor 28, but is shifted on the horizontal axis in the positive direction by an amount corresponding to the distance L.

An output when the first MR sensor 28 and the second MR sensor 30 are separated far enough away from the magnet 26 and receive no magnetic field 46 of the magnet 26 is shown as a reference output Vs. A predetermined value between the reference output Vs and the aforementioned maximum value $V_{MAX}$ is set as an ON threshold value $V_{ON}$, and a predetermined value between the reference output Vs and the aforementioned minimum value $V_{MIN}$ is set as an OFF threshold value $V_{OFF}$.

Figure 7:
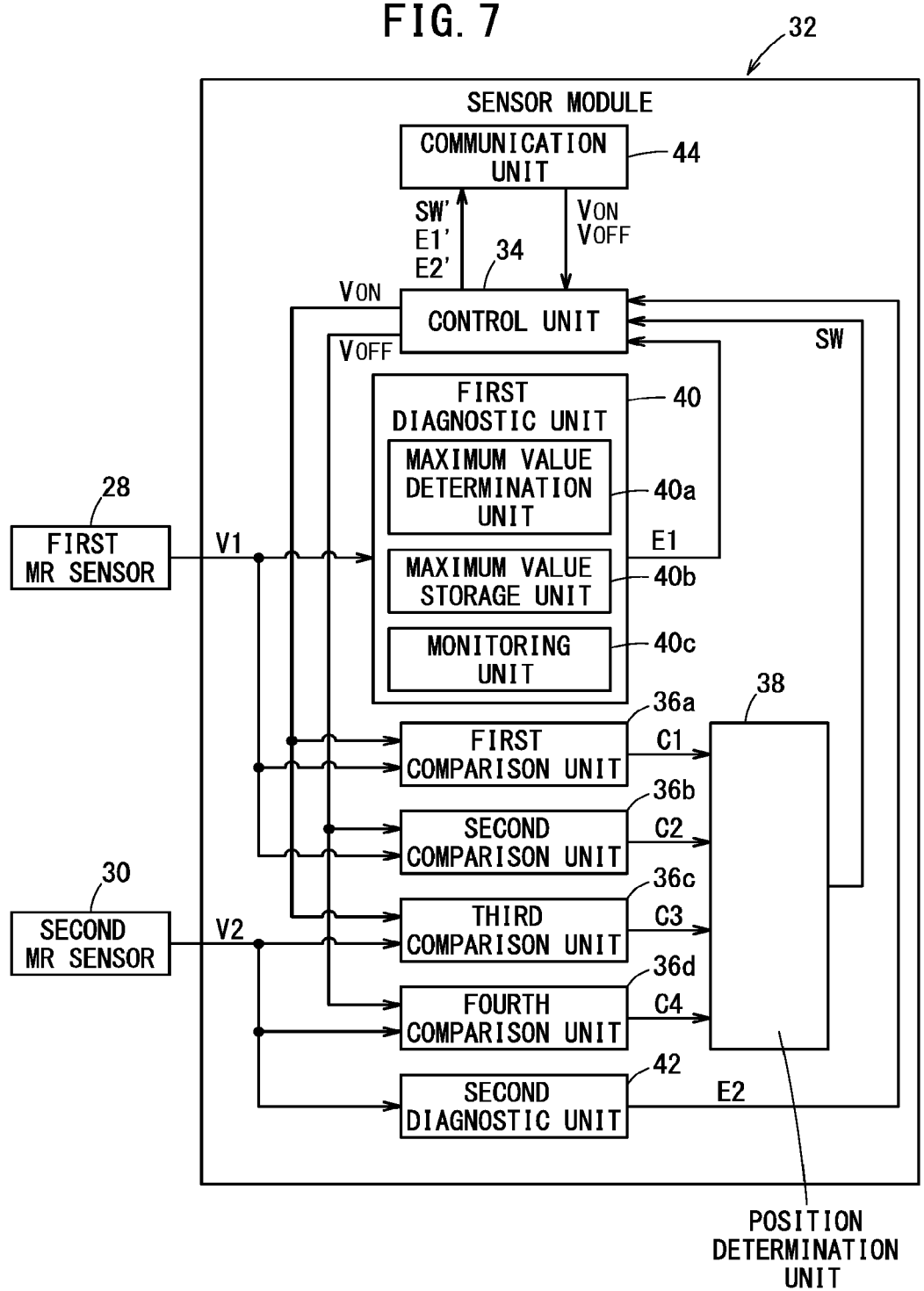
FIG. 7 is a block diagram showing a configuration of a sensor module that is provided in the fluid pressure cylinder shown in FIG. 1.

As shown in FIG. 7, the sensor module 32, which is connected to the first MR sensor 28 and the second MR sensor 30, includes a control unit 34, a first comparison unit 36a to a fourth comparison unit 36d, a position determination unit 38, a first diagnostic unit 40, a second diagnostic unit 42, and a communication unit 44. The ON threshold value $V_{ON}$ and the OFF threshold value $V_{OFF}$ described above are retained by the control unit 34.

The output V1 from the first MR sensor 28 is input to the first comparison unit 36a, and the ON threshold value $V_{ON}$ from the control unit 34 is input to the first comparison unit 36a. In the first comparison unit 36a, the output V1 of the first MR sensor 28 is compared with the ON threshold value $V_{ON}$. When the output V1 of the first MR sensor 28 is greater than or equal to the ON threshold value $V_{ON}$, the first comparison unit 36a raises a comparison signal C1, and when the output V1 of the first MR sensor 28 is less than the ON threshold value $V_{ON}$, the first comparison unit 36a lowers the comparison signal C1.

The output V1 from the first MR sensor 28 is input to the second comparison unit 36b, and the OFF threshold value $V_{OFF}$ from the control unit 34 is input to the second comparison unit 36b. In the second comparison unit 36b, the output V1 of the first MR sensor 28 is compared with the OFF threshold value $V_{OFF}$. When the output V1 of the first MR sensor 28 is less than or equal to the OFF threshold value $V_{OFF}$, the second comparison unit 36b raises a comparison signal C2, and when the output V1 of the first MR sensor 28 is greater than the OFF threshold value $V_{OFF}$, the second comparison unit 36b lowers the comparison signal C2.

The output V2 from the second MR sensor 30 is input to the third comparison unit 36c, and the ON threshold value $V_{ON}$ from the control unit 34 is input to the third comparison unit 36c. In the third comparison unit 36c, the output V2 of the second MR sensor 30 is compared with the ON threshold value $V_{ON}$. When the output V2 of the second MR sensor 30 is greater than or equal to the ON threshold value $V_{ON}$, the third comparison unit 36c raises a comparison signal C3, and when the output V2 of the second MR sensor 30 is less than the ON threshold value $V_{ON}$, the third comparison unit 36c lowers the comparison signal C3.

The output V2 from the second MR sensor 30 is input to the fourth comparison unit 36d, and the OFF threshold value $V_{OFF}$ from the control unit 34 is input to the fourth comparison unit 36d. In the fourth comparison unit 36d, the output V2 of the second MR sensor 30 is compared with the OFF threshold value $V_{OFF}$. When the output V2 of the second MR sensor 30 is less than or equal to the OFF threshold value $V_{OFF}$, the fourth comparison unit 36d raises a comparison signal C4, and when the output V2 of the second MR sensor 30 is greater than the OFF threshold value $V_{OFF}$, the fourth comparison unit 36d lowers the comparison signal C4.

Figure 8:
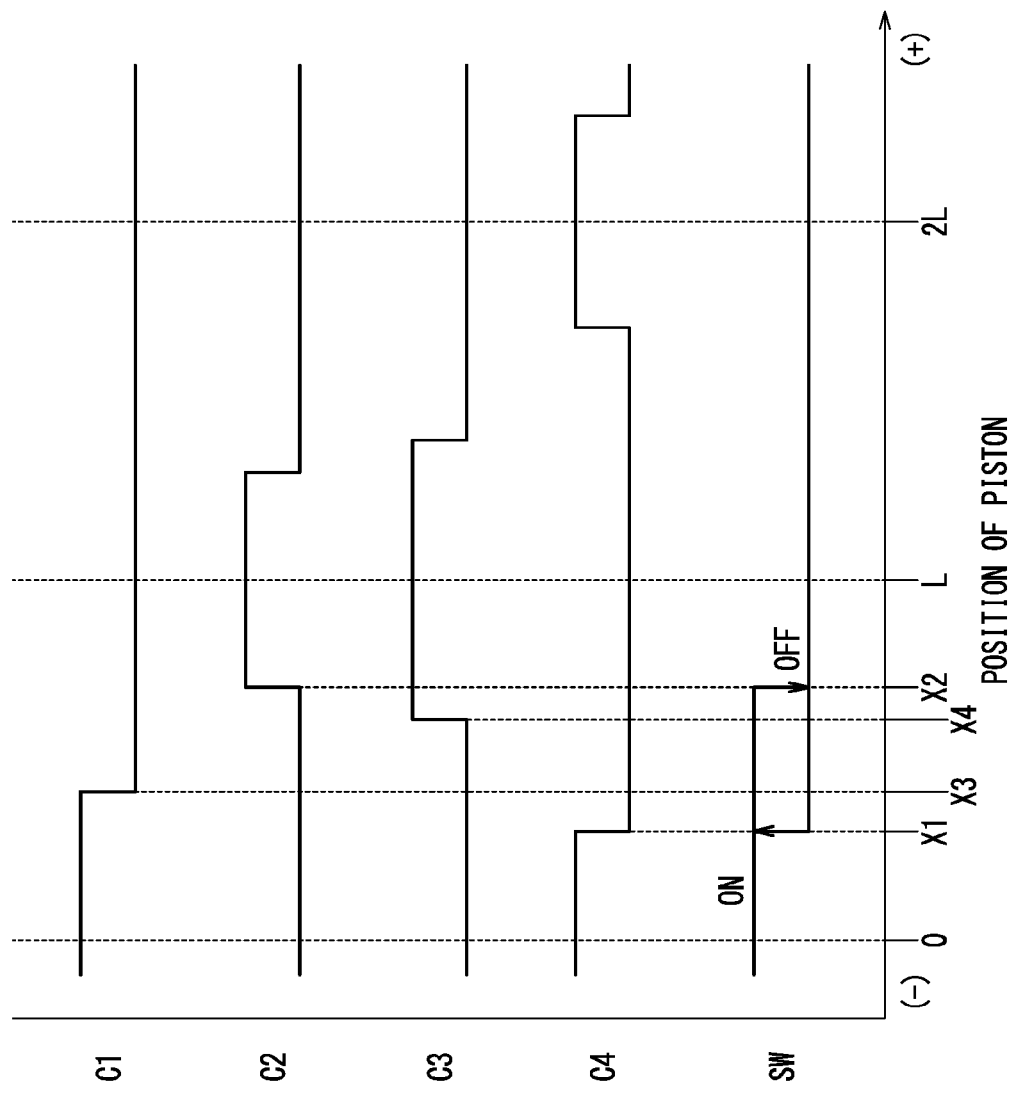
FIG. 8 is a diagram showing outputs or the like of comparison units corresponding to the position of the piston in the fluid pressure cylinder shown in FIG. 1.

States of the comparison signals C1 to C4 corresponding to the position X of the piston 18 are shown in FIG. 8. The comparison signal C1 is switched when the piston 18 reaches the position X3, which is slightly greater than X1. The comparison signal C2 is switched when the piston 18 reaches the position X2. The comparison signal C3 is switched when the piston 18 reaches the position X4, which is slightly less than X2. The comparison signal C4 is switched when the piston 18 reaches the position X1.

The comparison signals C1 to C4 are input to the position determination unit 38, and the position determination unit 38 determines whether or not the piston 18 has reached the predetermined position. The position determination unit 38 outputs a determination result as a switching signal SW to the control unit 34. The initial value of the switching signal SW is set to OFF. As shown in FIG. 8, the position determination unit 38 switches the switching signal SW from OFF to ON, when both of the comparison signal C1 and the comparison signal C4 are placed in a rising state, i.e., when the piston 18 moves in a direction to approach the origin point and reaches the position X1.

Further, the position determination unit 38 switches the switching signal SW from ON to OFF, when both of the comparison signal C2 and the comparison signal C3 are placed in a rising state, i.e., when the piston 18 moves in a direction away from the origin point and reaches the position X2. Switching of the switching signal SW from OFF to ON and switching of the switching signal SW from ON to OFF are shown in FIG. 8.

The control unit 34 is capable of communicating bidirectionally with the exterior via the communication unit 44. In response to the switching signal SW received from the position determination unit 38, the control unit 34 outputs, to the exterior via the communication unit 44, a signal SW' that, for example, instructs turning ON and turning OFF of a non-illustrated lamp. In this case, the lamp is in an illuminated state from when the piston 18 arrives at the position X1 during the drive step of the piston 18 until when the piston 18 arrives at the position X2 after switching to the return step.

When the lamp is turned ON, it is understood that the piston 18 has arrived in the vicinity of the stroke end of the drive step, and when the lamp is turned OFF, it is understood that it is immediately after the return step of the piston 18 has been initiated. Further, when the lamp is in an illuminated state, it is understood that the piston 18 exists within a predetermined region in close proximity to the rod cover 12. The switching signal SW may be used to control a non-illustrated external device that operates in connection with the fluid pressure cylinder 10.

It is possible to carry out, from the exterior, a change in the settings of the ON threshold value $V_{ON}$ and the OFF threshold value $V_{OFF}$ with respect to the sensor module 32. Upon receiving data related to the change in the settings of the ON threshold value $V_{ON}$ and the OFF threshold value $V_{OFF}$ from the exterior via the communication unit 44, the control unit 34 outputs a new ON threshold value $V_{ON}$ to the first comparison unit 36a and the third comparison unit 36c, and outputs a new OFF threshold value $V_{OFF}$ to the second comparison unit 36b and the fourth comparison unit 36d.

The magnetic force of the magnet 26 decreases (the magnet 26 is demagnetized) due to changes over time, and the sensitivity of the first MR sensor 28 and the second MR sensor 30 decreases when they are left in a high temperature environment for a long period of time. When such a situation occurs, although depending on the setting of the ON threshold value $V_{ON}$, there is a possibility that the maximum value $V_{MAX}$ of the output V1 of the first MR sensor 28 or the maximum value $V_{MAX}$ of the output V2 of the second MR sensor 30 may decrease to a level not exceeding the ON threshold value $V_{ON}$.

Thus, the first diagnostic unit 40 and the second diagnostic unit 42 are provided for the purpose of monitoring whether or not the maximum value $V_{MAX}$ of the output V1 of the first MR sensor 28 and the maximum value $V_{MAX}$ of the output V2 of the second MR sensor 30 have decreased by at least a predetermined amount due to changes over time or other reasons. The output V1 of the first MR sensor 28 is input to the first diagnostic unit 40, and the output V2 of the second MR sensor 30 is input to the second diagnostic unit 42. Hereinafter, the processing content in the first diagnostic unit 40 will be described, however, such content is the same as the processing content in the second diagnostic unit 42.

The first diagnostic unit 40 includes a maximum value determination unit 40a, a maximum value storage unit 40b, and a monitoring unit 40c. Each time that the output V1 of the first MR sensor 28 transitions from an increasing state to a decreasing state, the maximum value determination unit 40a transmits the output at that time (for example, the output V1 immediately prior to decreasing) as the maximum value $V_{MAX}$ to the maximum value storage unit 40b. The maximum value storage unit 40b stores in a time series manner the maximum value $V_{MAX}$ data received from the maximum value determination unit 40a.

From among a large number of the maximum value $V_{MAX}$ data stored in the maximum value storage unit 40b, the monitoring unit 40c periodically calculates the average value of a most recent predetermined number of data, and compares the calculated value with the average value of an initial predetermined number of data. In addition, in the case it is determined that the average value of the most recent predetermined number of data is smaller than the average value of the initial predetermined number of data by at least a predetermined value, a caution signal E1 is output to the control unit 34.

Upon receiving the caution signal E1 from the monitoring unit 40c of the first diagnostic unit 40, the control unit 34 outputs a caution signal E1' to the exterior via the communication unit 44, in order to notify that there is a high probability that an event such as lowering of the magnetization of the magnet 26 or a decrease in the sensitivity of the first MR sensor 28 has occurred. Consequently, it is possible to prompt the operator to perform maintenance such as replacement of component parts, and to prompt the operator to adjust the ON threshold value $V_{ON}$.

According to the present embodiment, the first diagnostic unit 40 monitors the maximum value $V_{MAX}$ of the output V1 of the first MR sensor 28, and the second diagnostic unit 42 monitors the maximum value $V_{MAX}$ of the output V2 of the second MR sensor 30, but the maximum value $V_{MAX}$ of the output V1 and the maximum value $V_{MAX}$ of the output V2 may be monitored comprehensively by a common diagnostic unit. In the case that both the maximum value $V_{MAX}$ of the output V1 and the maximum value $V_{MAX}$ of the output V2 have decreased by at least a predetermined amount, it is highly probable that lowering of the magnetization of the magnet 26 is the cause, whereas in the case that only one of them has decreased by at least a predetermined amount, it is highly probable that a decrease in the sensitivity of the concerned MR sensor is the cause. It is efficient if the common diagnostic unit outputs the caution signal by distinguishing between such events.

Next, a description will be given with reference to FIGS. 9 to 16 concerning a case in which the fluid pressure cylinder 10 is placed in an environment in which various external magnetic fields act thereon. Moreover, in FIG. 9 and other figures, the fluid pressure cylinder 10 is shown in a simplified manner.

Case in which a Magnetic Field of Another Cylinder Acts

Figure 9:
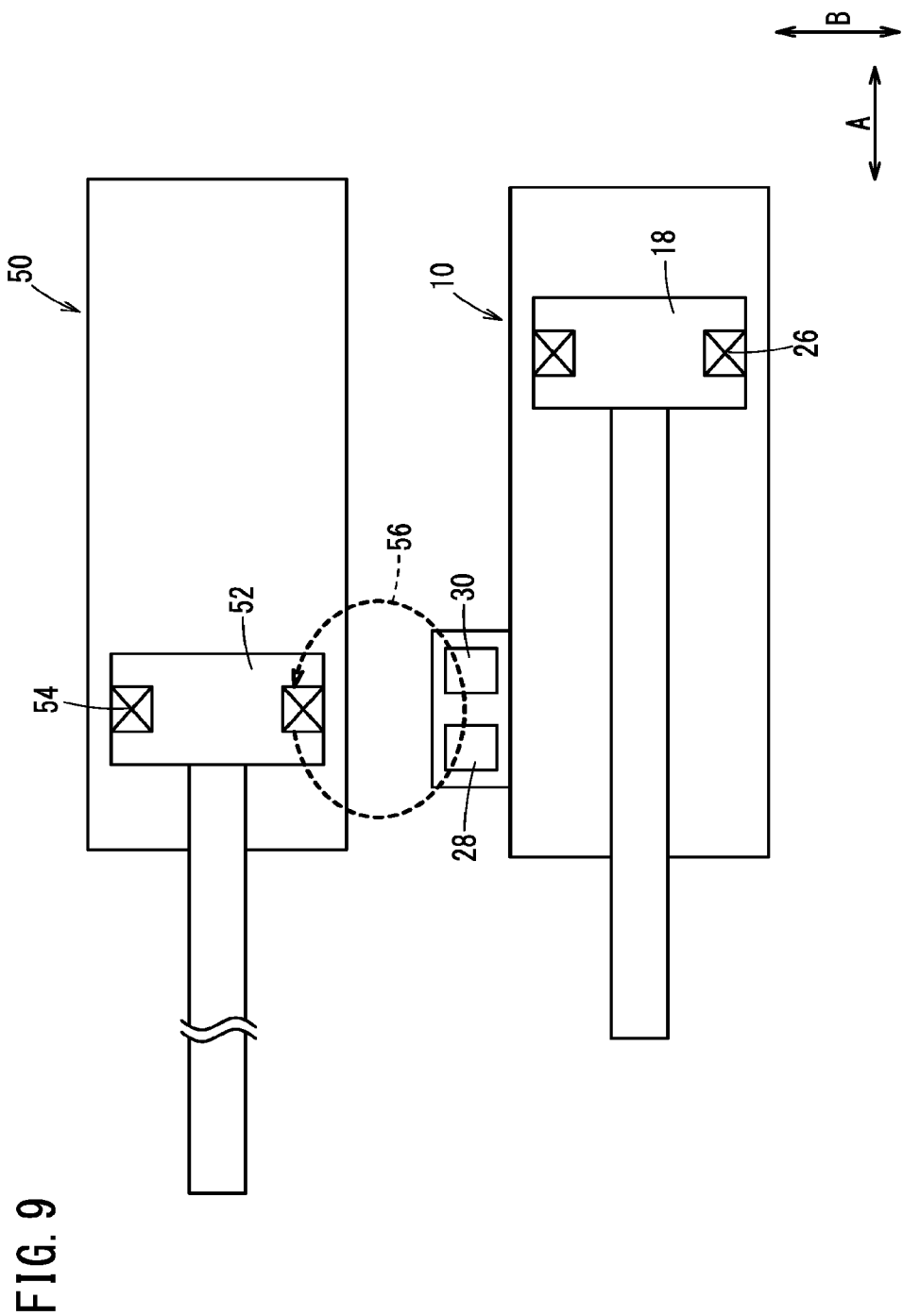
FIG. 9 is a diagram showing how a magnetic field of another fluid pressure cylinder acts on the fluid pressure cylinder shown in FIG. 1.

A case is assumed, as shown in FIG. 9, in which another fluid pressure cylinder 50 is arranged alongside the fluid pressure cylinder 10 in the B direction, and a magnetic field 56 of a magnet 54 mounted on a piston 52 of the other fluid pressure cylinder 50 acts on the first MR sensor 28 and the second MR sensor 30 of the fluid pressure cylinder 10. The magnetic field 56 acting on the first MR sensor 28 and the second MR sensor 30 fluctuates according to the operating position of the other fluid pressure cylinder 50.

Figure 10:
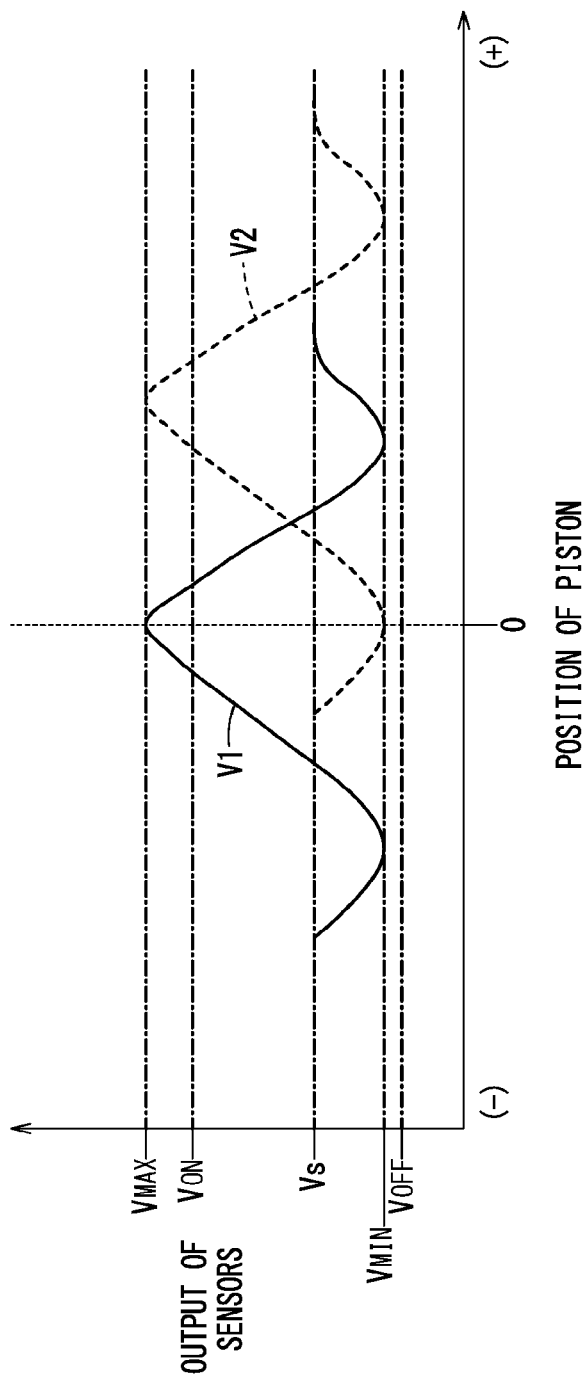
FIG. 10 is a diagram showing outputs of the MR sensors based on the magnetic field of the other fluid pressure cylinder.

An example of the output V1 of the first MR sensor 28 and the output V2 of the second MR sensor 30 based on the magnetic field 56 of the other fluid pressure cylinder 50 is shown in FIG. 10. The horizontal axis indicates the position of the piston 52 of the other fluid pressure cylinder 50 along the A direction, and the vertical axis indicates the output of the sensors. The output V1 of the first MR sensor 28 is shown by a solid line, and the output V2 of the second MR sensor 30 is shown by a dashed line. The origin point of the position of the piston 52 is set to a position corresponding to the aforementioned reference position of the piston 18 of the fluid pressure cylinder 10 in the A direction.

A distance in the B direction from the first MR sensor 28 and the second MR sensor 30 to the magnet 54 of the other fluid pressure cylinder 50 is greater than a distance in the B direction from the first MR sensor 28 and the second MR sensor 30 to the magnet 26 of the fluid pressure cylinder 10. Therefore, as shown in FIG. 10, it is unlikely that the output V2 of the second MR sensor 30 will be less than or equal to the OFF threshold value $V_{OFF}$. Accordingly, the probability that the switching signal SW will be turned ON or turned OFF is low, and when the magnetic field 56 of the other fluid pressure cylinder 50 acts, erroneous detection of the piston 18 of the fluid pressure cylinder 10 as being in the predetermined position can be prevented. If the setting of the OFF threshold value $V_{OFF}$ is changed so as to depart from the reference output Vs, erroneous detection can be prevented more reliably.

Case in which a Welding Magnetic Field Acts

A case is assumed in which the fluid pressure cylinder 10 is installed in a welding line, and a magnetic field (welding magnetic field) generated by a welding current acts on the first MR sensor 28 and the second MR sensor 30 of the fluid pressure cylinder 10. Unlike the magnetic field of the magnet, the welding magnetic field is made up from only unidirectional components. Hereinafter, a case in which the direction of the welding magnetic field is the A direction, and a case in which the direction of the welding magnetic field is the B direction will be described separately.

Figure 11:
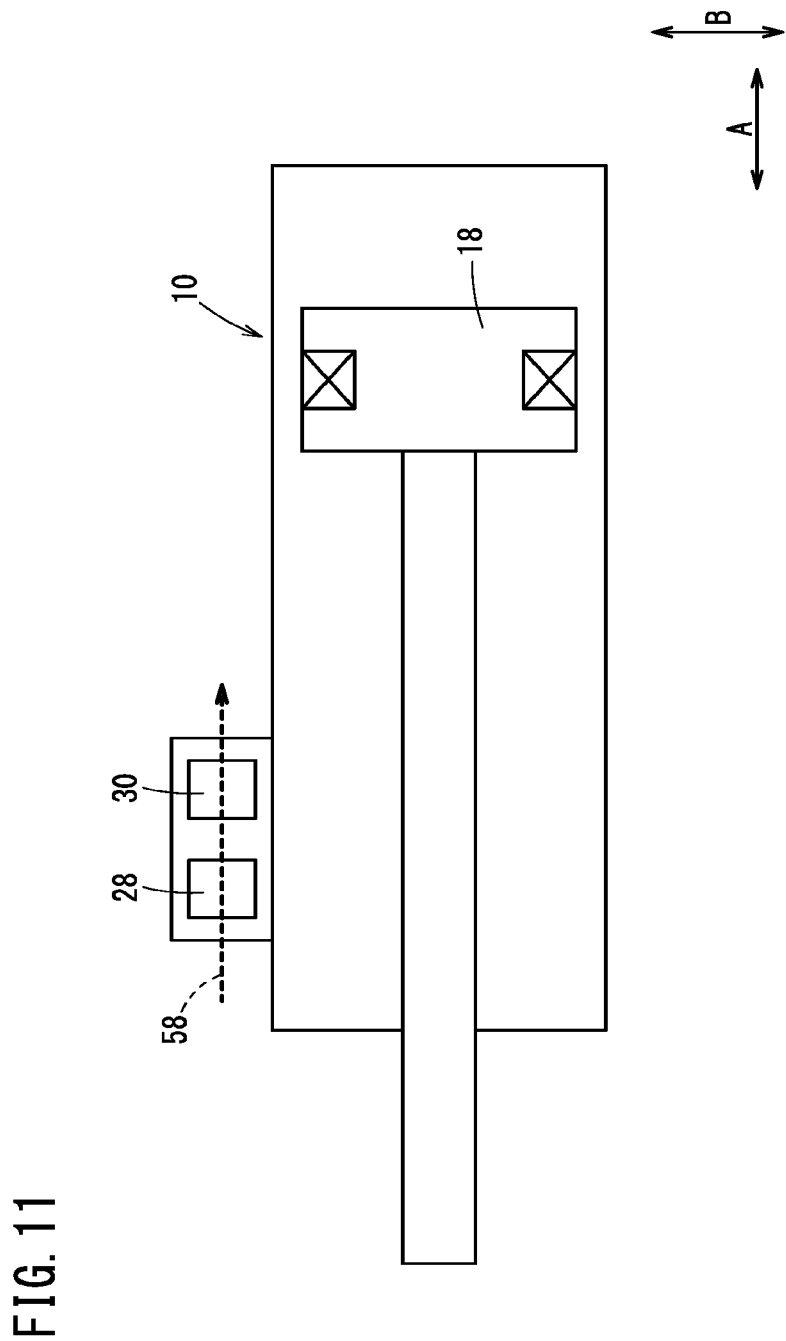
FIG. 11 is a diagram showing how a welding magnetic field in an A direction acts on the fluid pressure cylinder shown in FIG. 1.
Figure 12:
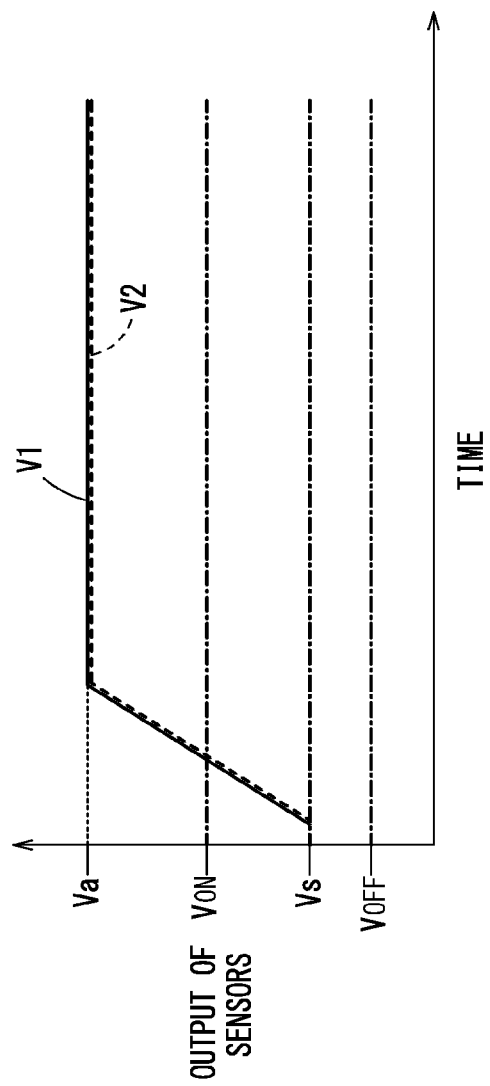
FIG. 12 is a diagram showing outputs of the MR sensors based on the welding magnetic field in the A direction.

As shown in FIG. 11, a case is assumed in which a welding magnetic field 58 in the A direction acts on the first MR sensor 28 and the second MR sensor 30. An example of the output V1 of the first MR sensor 28 and the output V2 of the second MR sensor 30 based on the welding magnetic field 58 is shown in FIG. 12. The horizontal axis indicates time, and the vertical axis indicates the output of the sensors. Since the welding current is constant, the output V1 of the first MR sensor 28 and the output V2 of the second MR sensor 30, when welding is initiated, rise from the reference output Vs, and thereafter are maintained at a constant value Va. The output V2 of the second MR sensor 30 coincides with the output V1 of the first MR sensor 28.

As shown in FIG. 12, the above-described constant value Va is greater than or equal to the ON threshold value $V_{ON}$, however, the output V1 of the first MR sensor 28 and the output V2 of the second MR sensor 30 never become smaller than the reference output Vs, and the output V1 of the first MR sensor 28 and the output V2 of the second MR sensor 30 never become less than or equal to the OFF threshold value $V_{OFF}$. Accordingly, the switching signal SW is not turned ON or OFF, and therefore, when the welding magnetic field 58 in the A direction acts, erroneous detection of the piston 18 as being in the predetermined position can be prevented.

Figure 13:
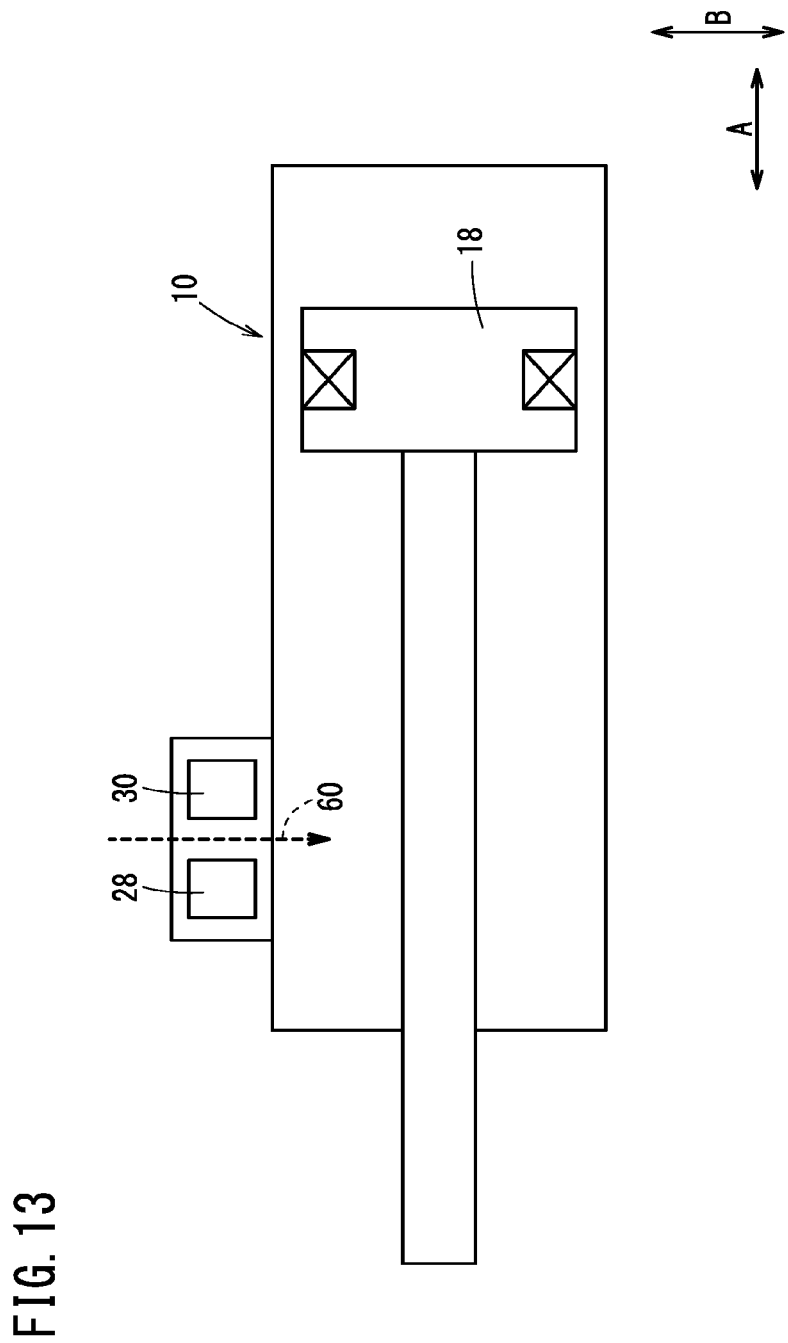
FIG. 13 is a diagram showing how a welding magnetic field in a B direction acts on the fluid pressure cylinder shown in FIG. 1.
Figure 14:
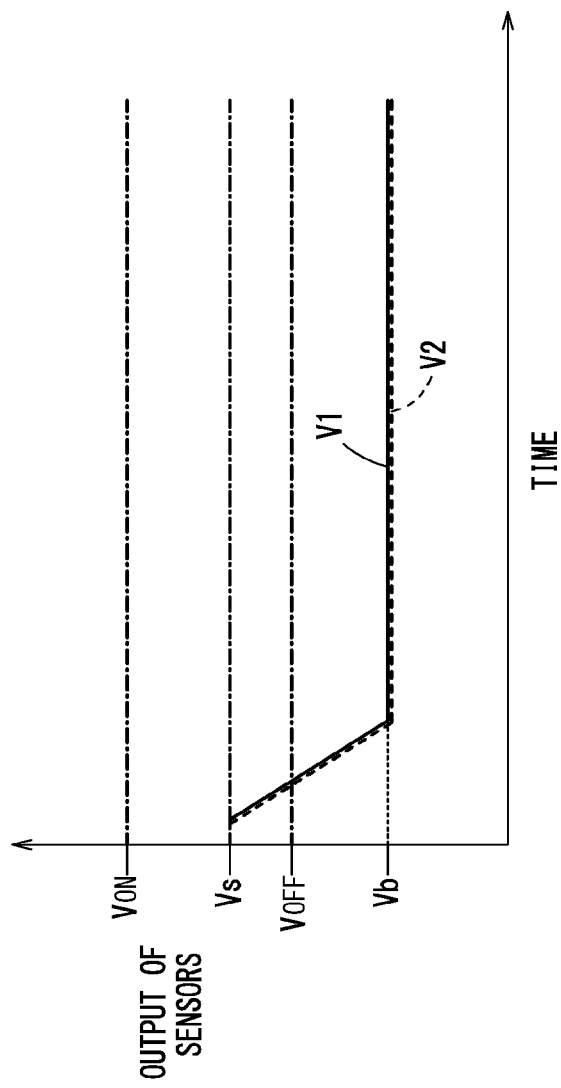
FIG. 14 is a diagram showing outputs of the MR sensors based on the welding magnetic field in the B direction.

As shown in FIG. 13, a case is assumed in which a welding magnetic field 60 in the B direction acts on the first MR sensor 28 and the second MR sensor 30. An example of the output V1 of the first MR sensor 28 and the output V2 of the second MR sensor 30 based on the welding magnetic field 60 is shown in FIG. 14. The horizontal axis indicates time, and the vertical axis indicates the output of the sensors. Since the welding current is constant, the output V1 of the first MR sensor 28 and the output V2 of the second MR sensor 30, when welding is initiated, fall from the reference output Vs, and thereafter are maintained at a constant value Vb. The output V2 of the second MR sensor 30 coincides with the output V1 of the first MR sensor 28.

As shown in FIG. 14, the above-described constant value Vb is less than or equal to the OFF threshold value $V_{OFF}$, however, the output V1 of the first MR sensor 28 and the output V2 of the second MR sensor 30 never become larger than the reference output Vs, and the output V1 of the first MR sensor 28 and the output V2 of the second MR sensor 30 never become greater than or equal to the ON threshold value $V_{ON}$. Accordingly, the switching signal SW is not turned ON or OFF, and when the welding magnetic field 60 in the B direction acts, erroneous detection of the piston 18 as being in the predetermined position can be prevented.

Case in which a Magnetic Field from a Magnetized Bolt or the Like Acts

Figure 15:
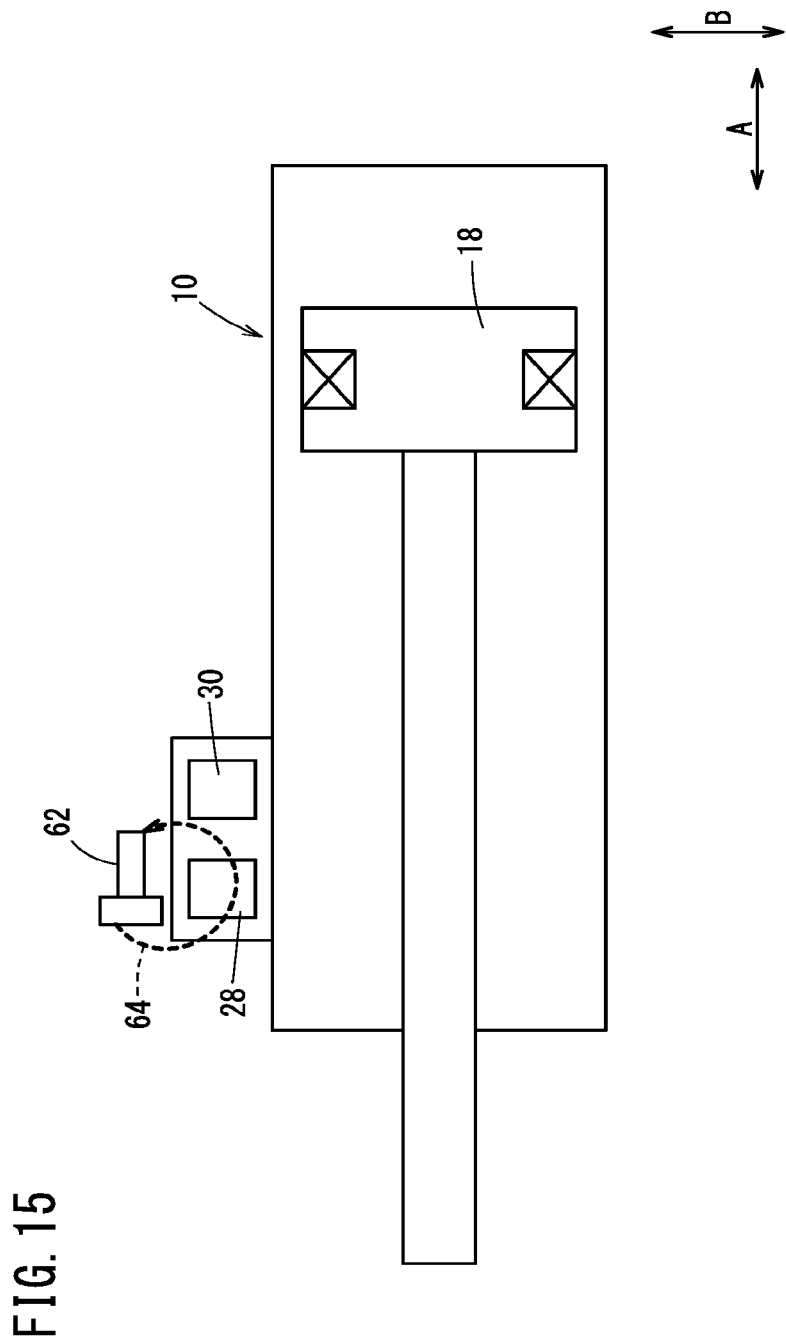
FIG. 15 is a diagram showing how a magnetic field of a magnetized bolt acts on the fluid pressure cylinder shown in FIG. 1.
Figure 16:
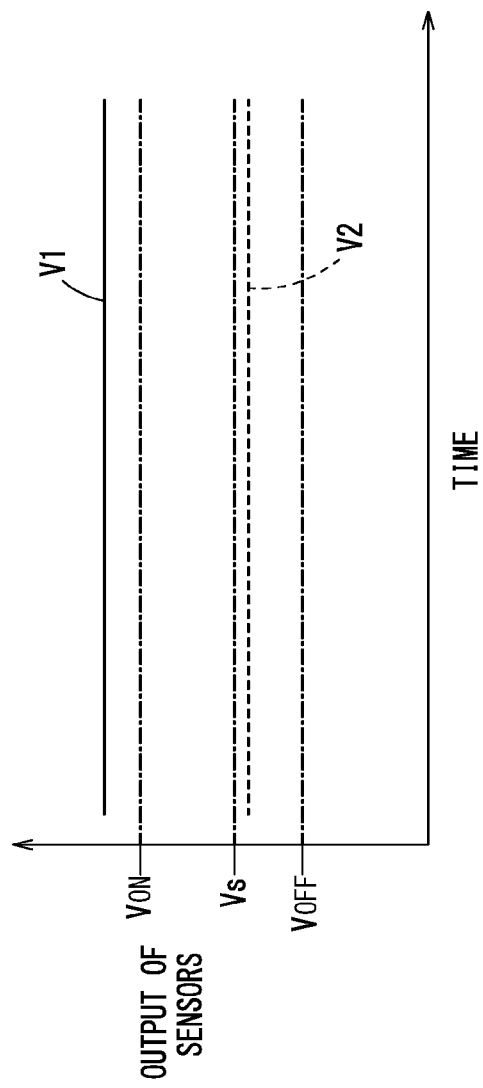
FIG. 16 is a diagram showing outputs of the MR sensors based on the magnetic field of the magnetized bolt.

As shown in FIG. 15, a case is assumed in which a mounting member 62 such as a bolt or the like used in assembling or installing the fluid pressure cylinder 10 is magnetized by a welding magnetic field, and a magnetic field 64 of the mounting member 62 acts on the first MR sensor 28 and the second MR sensor 30 of the fluid pressure cylinder 10. An example of the output V1 of the first MR sensor 28 and the output V2 of the second MR sensor 30 based on the magnetic field 64 of the magnetized mounting member 62 is shown in FIG. 16. The horizontal axis indicates time, and the vertical axis indicates the output of the sensors. The output V1 of the first MR sensor 28 is shown by a solid line, and the output V2 of the second MR sensor 30 is shown by a dashed line.

The magnetic field (magnetic flux) 64, which emerges from one end side of the mounting member 62 and returns to another end side of the mounting member 62, is formed around the magnetized mounting member 62, however, the magnetic field 64 does not fluctuate at all. Accordingly, at least the switching signal SW is not turned ON or OFF, and when the magnetic field 64 of the mounting member 62 such as a magnetized bolt or the like acts, erroneous detection of the piston 18 as being in the predetermined position can be prevented.

According to the fluid pressure cylinder 10 of the present embodiment, the two MR sensors 28 and 30, each of which is equipped with the pair of magnetoresistive effect element patterns that react respectively in two directions perpendicular to each other, are arranged at the predetermined interval L, whereby the position of the piston 18 can be detected with high accuracy, and the position of the piston 18 is not erroneously detected even if various external magnetic fields act thereon.

Further, the first diagnostic unit 40 and the second diagnostic unit 42, which monitor whether or not the maximum values $V_{MAX}$ of the output V1 of the first MR sensor 28 and the output V2 of the second MR sensor 30 have decreased by at least a predetermined amount, are provided, and therefore, lowering of the magnetization of the magnet 26 and a decrease in the sensitivity of the first MR sensor 28 or the second MR sensor 30 can be easily known.

Second Embodiment

Next, a description will be given with reference to FIGS. 17 to 20 concerning a fluid pressure cylinder 70 according to a second embodiment of the present invention. In the fluid pressure cylinder 70 according to the second embodiment, constituent elements thereof, which are the same as or equivalent to those of the above-described fluid pressure cylinder 10, are denoted by the same reference numerals, and detailed description thereof is omitted.

The first embodiment is suitable for a case in which the position of the piston 18 to be detected is in close proximity to the rod cover 12, whereas the second embodiment is suitable even for a case in which the position of the piston 18 to be detected is not in close proximity to the rod cover 12. More specifically, according to the second embodiment, the reference position of the piston 18 is capable of being set to an arbitrary position.

Figure 17:
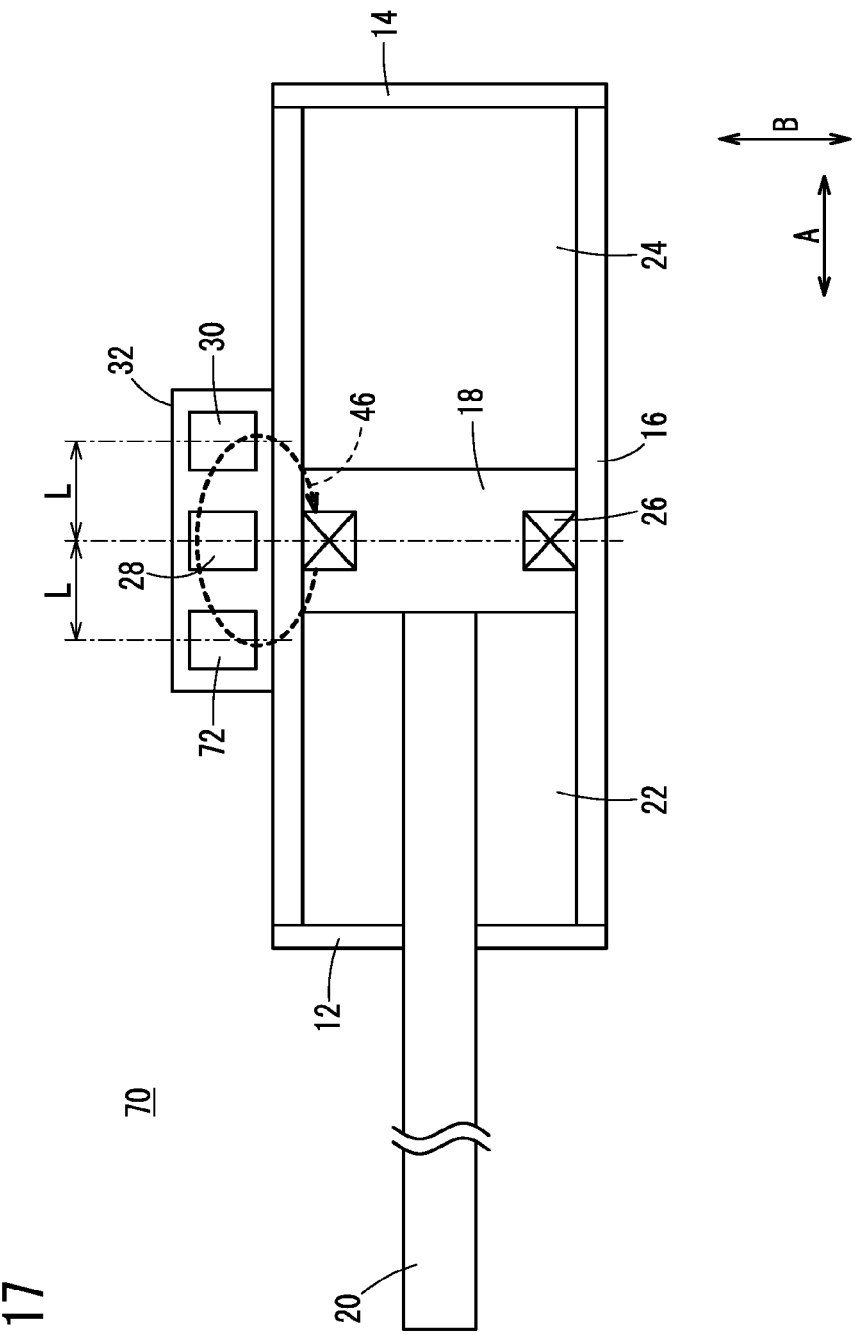
FIG. 17 is a schematic diagram at a time when a fluid pressure cylinder according to a second embodiment of the present invention is in a predetermined operating position.

As shown in FIG. 17, a third MR sensor 72, the first MR sensor 28, and the second MR sensor 30, which serve as magnetic sensors in which magnetoresistive effect elements are used, are mounted on the outer side of the cylinder tube 16 alongside one another in this order in the A direction. The interval between the third MR sensor 72 and the first MR sensor 28 is the same as the interval L between the first MR sensor 28 and the second MR sensor 30.

The third MR sensor 72 has the same configuration as that of the first MR sensor 28, and similarly to the first MR sensor 28, is mounted on the outer side of the cylinder tube 16, at a posture so that the direction in which the first magnetoresistive effect element pattern reacts becomes the A direction, and the direction in which the second magnetoresistive effect element pattern reacts becomes the B direction. When the piston 18 is in the reference position shown in FIG. 17, the third MR sensor 72 mainly receives the component in the B direction of the magnetic field 46 of the magnet 26 in the same manner as the second MR sensor 30.

Figure 18:
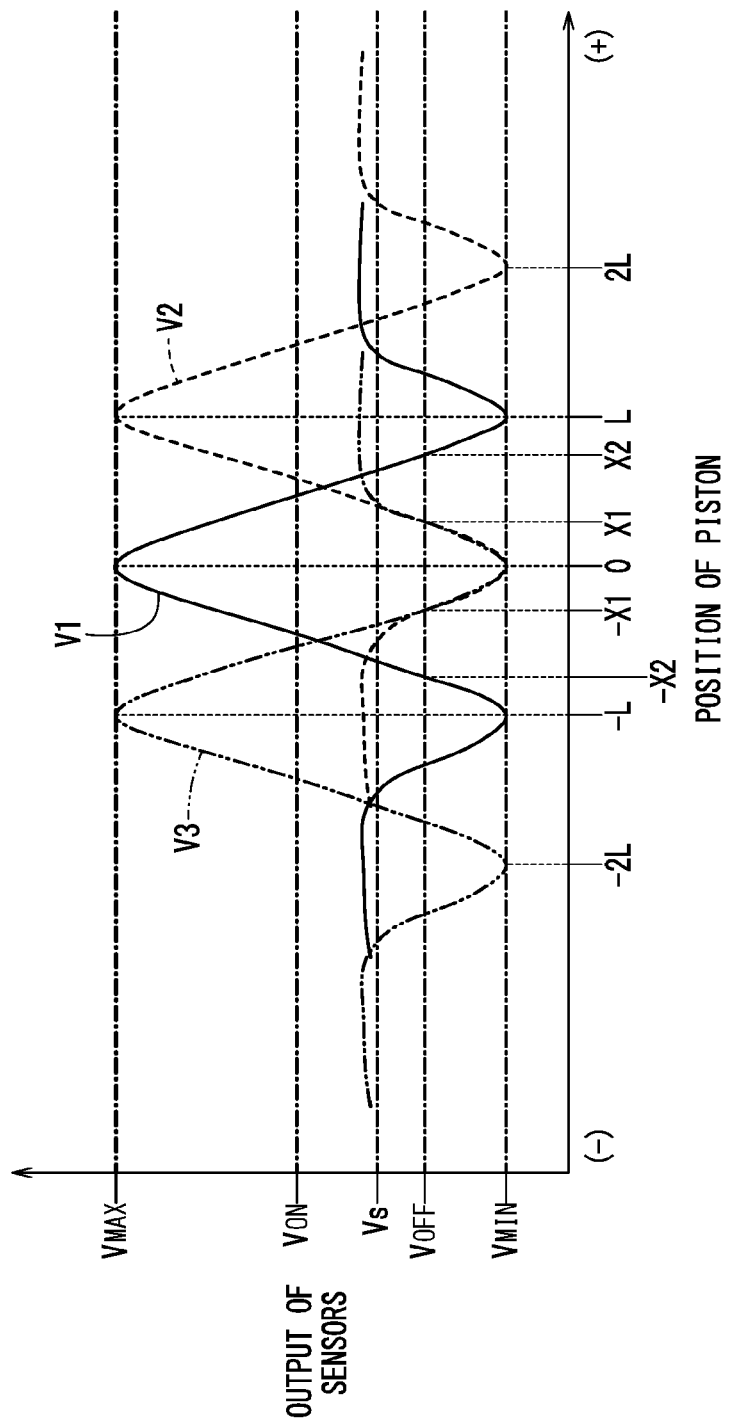
FIG. 18 is a diagram showing outputs of MR sensors corresponding to a position of a piston in the fluid pressure cylinder shown in FIG. 17.

FIG. 18 is a diagram showing the output V1 of the first MR sensor 28, the output V2 of the second MR sensor 30, and an output V3 of the third MR sensor 72 corresponding to the position X of the piston 18. The horizontal axis indicates the position X of the piston 18, and the vertical axis indicates the output of the sensors. The output V1 of the first MR sensor 28 is shown by a solid line, the output V2 of the second MR sensor 30 is shown by a dashed line, and the output V3 of the third MR sensor 72 is shown by a two-dot dashed line. The position X of the piston 18 is set to an origin point when the piston 18 is at the reference position, assumes a positive value when the piston 18 is on the right side of the reference position, and assumes a negative value when the piston 18 is on the left side of the reference position.

The output V1 of the first MR sensor 28 becomes a maximum value $V_{MAX}$ when X=0, and becomes a minimum value $V_{MIN}$ when X=L and X=−L. The output V2 of the second MR sensor 30 becomes a maximum value $V_{MAX}$ when X=L, and becomes a minimum value $V_{MIN}$ when X=0. The output V3 of the third MR sensor 72 becomes a maximum value $V_{MAX}$ when X=−L, and becomes a minimum value $V_{MIN}$ when X=0. Since the third MR sensor 72 is arranged to the left by the predetermined distance L from the first MR sensor 28, the waveform of the output V3 of the third MR sensor 72 is the same as the waveform of the output V1 of the first MR sensor 28, but is shifted on the horizontal axis in the negative direction by an amount corresponding to the distance L.

Figure 19:
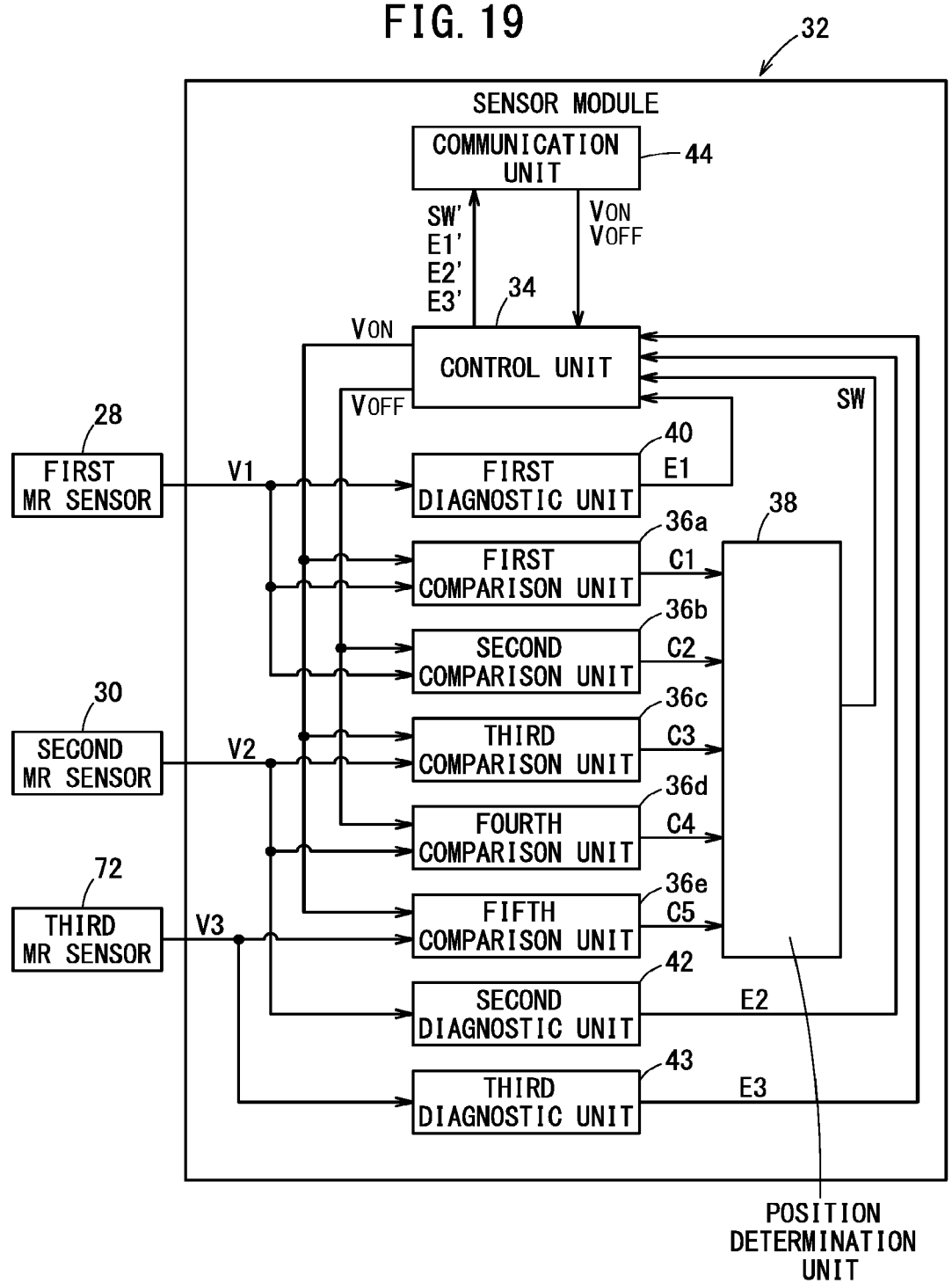
FIG. 19 is a block diagram showing a configuration of a sensor module that is provided in the fluid pressure cylinder shown in FIG. 17.

As shown in FIG. 19, the sensor module 32, which is connected to the first MR sensor 28, the second MR sensor 30, and the third MR sensor 72, includes the control unit 34, the first comparison unit 36a to a fifth comparison unit 36e, the position determination unit 38, the first diagnostic unit 40, the second diagnostic unit 42, a third diagnostic unit 43, and the communication unit 44.

The output V3 from the third MR sensor 72 is input to the fifth comparison unit 36e, and the ON threshold value $V_{ON}$ from the control unit 34 is input to the fifth comparison unit 36e. In the fifth comparison unit 36e, the output V3 of the third MR sensor 72 is compared with the ON threshold value $V_{ON}$. When the output V3 of the third MR sensor 72 is greater than or equal to the ON threshold value $V_{ON}$, the fifth comparison unit 36e raises a comparison signal C5, and when the output V3 of the third MR sensor 72 is less than the ON threshold value $V_{ON}$, the fifth comparison unit 36e lowers the comparison signal C5.

States of the comparison signals C1 to C5 corresponding to the position X of the piston 18 are shown in FIG. 20. The comparison signal C1 is switched when the piston 18 reaches the position X3, which is slightly greater than X1, and when the piston 18 reaches the position −X3, which is slightly less than −X1. The comparison signal C2 is switched when the piston 18 reaches the position X2, and when the piston 18 reaches the position −X2. The comparison signal C3 is switched when the piston 18 reaches the position X4, which is slightly less than X2. The comparison signal C4 is switched when the piston 18 reaches the position X1, and when the piston 18 reaches the position −X1. The comparison signal C5 is switched when the piston 18 reaches the position −X4, which is slightly greater than −X2.

The comparison signals C1 to C5 are input to the position determination unit 38, and the position determination unit 38 determines whether or not the piston 18 has reached the predetermined position. The position determination unit 38 outputs a determination result as a switching signal SW to the control unit 34. The initial value of the switching signal SW is set to OFF. As shown in FIG. 20, the position determination unit 38 switches the switching signal SW from OFF to ON, when both of the comparison signal C1 and the comparison signal C4 are placed in a rising state. More specifically, the switching signal SW is switched from OFF to ON when the piston 18 moves in a direction to approach the origin point from the right side and reaches the position X1, and when the piston 18 moves in a direction to approach the origin point from the left side and reaches the position −X1.

Further, the position determination unit 38 switches the switching signal SW from ON to OFF, when both of the comparison signal C2 and the comparison signal C3 are placed in a rising state, i.e., when the piston 18 moves in a rightward direction away from the origin point and reaches the position X2. Furthermore, the position determination unit 38 switches the switching signal SW from ON to OFF, when both of the comparison signal C2 and the comparison signal C5 are placed in a rising state, i.e., when the piston 18 moves in a leftward direction away from the origin point and reaches the position −X2.

Switching of the switching signal SW from OFF to ON and switching of the switching signal SW from ON to OFF are shown in FIG. 20. As can be understood from this drawing, the switching signal SW is turned ON when the piston 18 is in a limited region centered about the origin, and therefore, it is easy to detect that the piston 18 is in close proximity to the reference position (the origin point).

The third diagnostic unit 43 is provided for the purpose of monitoring whether or not the maximum value $V_{MAX}$ of the output V3 of the third MR sensor 72 has decreased by at least a predetermined amount due to changes over time or other reasons. The output V3 of the third MR sensor 72 is input to the third diagnostic unit 43. The processing content in the third diagnostic unit 43 is the same as the processing content in the aforementioned first diagnostic unit 40.

According to the fluid pressure cylinder 70 of the present embodiment, since the third MR sensor 72 is provided in addition to the first MR sensor 28 and the second MR sensor 30, the position of the piston 18 to be detected is not limited to being in close proximity to the rod cover 12 and can be set at any position.

The fluid pressure cylinder according to the present invention is not limited to the above-described embodiment. It goes without saying that various configurations could be adopted therein without departing from the gist of the present invention.

The invention claimed is:

1. A fluid pressure cylinder configured to detect that a piston is in a predetermined position by detecting a magnetic field of a magnet mounted on the piston, using a first magnetoresistive sensor and a second magnetoresistive sensor mounted on a cylinder tube, wherein
the first magnetoresistive sensor and the second magnetoresistive sensor are each a combination of a first magnetoresistive effect element pattern in which a resistance value thereof decreases according to an intensity of the magnetic field oriented in a direction parallel to an axial direction of the piston, and a second magnetoresistive effect element pattern in which a resistance value thereof decreases according to an intensity of the magnetic field oriented in a direction parallel to a radial direction of the piston, and the first magnetoresistive sensor and the second magnetoresistive sensor are arranged at a predetermined interval in a manner so that, when the first magnetoresistive sensor mainly receives a magnetic field component of the magnet oriented in the direction parallel to the axial direction of the piston, the second magnetoresistive sensor mainly receives a magnetic field component of the magnet oriented in the direction parallel to the radial direction of the piston.

2. The fluid pressure cylinder according to claim 1, comprising a sensor module connected to the first magnetoresistive sensor and the second magnetoresistive sensor, wherein
the sensor module includes a first comparison unit configured to compare an output of the first magnetoresistive sensor with an ON threshold value that is greater than a reference output value, a third comparison unit configured to compare an output of the second magnetoresistive sensor with the ON threshold value, a second comparison unit configured to compare the output of the first magnetoresistive sensor with an OFF threshold value that is less than the reference output value, and a fourth comparison unit configured to compare the output of the second magnetoresistive sensor with the OFF threshold value.

3. The fluid pressure cylinder according to claim 2, wherein the sensor module includes a position determination unit configured to switch a switching signal from OFF to ON when the output of the first magnetoresistive sensor is greater than or equal to the ON threshold value and the output of the second magnetoresistive sensor is less than or equal to the OFF threshold value, and further, to switch the switching signal from ON to OFF when the output of the first magnetoresistive sensor is less than or equal to the OFF threshold value and the output of the second magnetoresistive sensor is greater than or equal to the ON threshold value.

4. The fluid pressure cylinder according to claim 2, wherein settings of the ON threshold value and the OFF threshold value are configured to he changed.

5. The fluid pressure cylinder according to claim 1, comprising a sensor module connected to the first magnetoresistive sensor and the second magnetoresistive sensor, wherein
the sensor module includes a diagnostic unit configured to monitor whether or not a maximum value of an output of the first magnetoresistive sensor and a maximum value of an output of the second magnetoresistive sensor have decreased by at least a predetermined amount.

6. A fluid pressure cylinder configured to detect that a piston is in a predetermined position, by detecting a magnetic field of a magnet mounted on the piston, using a first magnetoresistive sensor, a second magnetoresistive sensor, and a third magnetoresistive sensor mounted on a cylinder tube, wherein
the first magnetoresistive sensor, the second magnetoresistive sensor, and the third magnetoresistive sensor are each a combination of a first magnetoresistive effect element pattern in which a resistance value thereof decreases according to an intensity of the magnetic field oriented in a direction parallel to an axial direction of the piston, and a second magnetoresistive effect element pattern in which a resistance value thereof decreases according to an intensity of the magnetic field oriented in a direction parallel to a radial direction of the piston, and the first magnetoresistive sensor, the second magnetoresistive sensor, and the third magnetoresistive sensor are arranged alongside one another at a predetermined interval in the direction parallel to the axial direction of the piston in a manner so that, when the first magnetoresistive sensor mainly receives a magnetic field component of the magnet oriented in the direction parallel to the axial direction of the piston, the second magnetoresistive sensor and the third magnetoresistive sensor mainly receive a magnetic field component of the magnet oriented in the direction parallel to the radial direction of the piston.

7. The fluid pressure cylinder according to claim 6, comprising a sensor module connected to the first magnetoresistive sensor, the second magnetoresistive sensor, and the third magnetoresistive sensor, wherein the sensor module includes a first comparison unit configured to compare an output of
the first magnetoresistive sensor with an ON threshold value that is greater than a reference output value, a third comparison unit configured to compare an output of the second magnetoresistive sensor with the ON threshold value, a second comparison unit configured to compare he output of the first magnetoresistive sensor with an OFF threshold value that is less than the reference output value, a fourth comparison unit configured to compare the output of the second magnetoresistive sensor with the OFF threshold value, and a fifth comparison unit configured to compare an output of the third tnagnetoresistive sensor with the ON threshold value.

8. The fluid pressure cylinder according to claim 7, wherein the sensor module includes a position determination unit configured to switch a switching signal from OFF to ON when the output of the first magnetoresistive sensor is greater than or equal to the ON threshold value and the output of the second magnetoresistive sensor is less than or equal to the OFF threshold value, and further, to switch the switching signal from ON to OFF when the output of the first magnetoresistive sensor is less than or equal to the OFF threshold value and the output of the second magnetoresistive sensor is greater than or equal to the ON threshold value, and additionally, when the output of the first magnetoresistive sensor is less than or equal to the OFF threshold value and the output of the third magnetoresistive sensor is greater than or equal to the ON threshold value.

9. The fluid pressure cylinder according to claim 7, wherein settings of the ON threshold value and the OFF threshold value are configured to be changed.

10. The fluid pressure cylinder according to claim 6, comprising a sensor module connected to the first magnetoresistive sensor, the second magnetoresistive sensor, and the third magnetoresistive sensor, wherein
the sensor module includes a diagnostic unit configured to monitor whether or not a maximum value of an output of the first magnetoresistive sensor, a maximum value of an output of the second magnetoresistive sensor, and a tmaximum value of an output of the third magnetoresistive sensor have decreased by at least a predetermined amount.

* * * * *